(12) United States Patent
Park (10) Patent No.: US 8,029,132 B1
(45) Date of Patent: Oct. 4, 2011

(54) 3D EYEGLASSES WITH DETACHABLE FRONT EYEGLASSES FRAME

(75) Inventor: Soo An Park, Seongnam-si (KR)

(73) Assignee: Korea Ogk Co., Ltd., Wonju-si (KR)

( * ) Notice: Subject to any disclaimer, the term of this patent is extended or adjusted under 35 U.S.C. 154(b) by 0 days.

(21) Appl. No.: 13/051,791

(22) Filed: Mar. 18, 2011

(30) Foreign Application Priority Data

Oct. 11, 2010  (KR) .................. 20-2010-0010395

(51) Int. Cl.
*G02C 9/02* (2006.01)
(52) U.S. Cl. .............................. 351/59; 351/86; 351/106
(58) Field of Classification Search .................... 351/59, 351/47, 48, 57, 58, 86, 83, 103, 106, 41, 351/158
See application file for complete search history.

(56) References Cited

U.S. PATENT DOCUMENTS

| | | | | |
|---|---|---|---|---|
| 3,238,005 A * | 3/1966 | Petitto | .............................. | 351/59 |
| 3,252,747 A * | 5/1966 | Robins | .............................. | 351/59 |
| 3,383,707 A * | 5/1968 | McNeill | .............................. | 2/12 |
| 4,400,067 A * | 8/1983 | Joffe | .............................. | 351/59 |
| 6,474,810 B1 * | 11/2002 | Ng | .............................. | 351/47 |
| 7,048,372 B1 * | 5/2006 | Cohen | .............................. | 351/103 |

* cited by examiner

*Primary Examiner* — Hung Dang
(74) *Attorney, Agent, or Firm* — Birch, Stewart, Kolasch & Birch, LLP (57) ABSTRACT

The present invention relates to 3D eyeglasses with a detachable front eyeglasses frame, including: eyeglasses arms having a coupling rim disposed in the middle portion thereof and attaching and detaching protrusions formed at the center portion of the coupling rim; the detachable front eyeglasses frame having lens insertion holes formed on both sides thereof, fixing protrusions formed at each of the upper and lower sides of the lens insertion holes on the rear surface thereof, and attaching and detaching grooves formed at the center portion of the rear surface thereof; and 3D eyeglasses lenses adapted to be inserted into the lens insertion holes of the detachable front eyeglasses frame.

2 Claims, 8 Drawing Sheets

3D EYEGLASSES WITH DETACHABLE FRONT EYEGLASSES FRAME

BACKGROUND OF THE INVENTION

1. Field of the Invention

The present invention relates to 3D eyeglasses with a detachable front eyeglasses frame that are easy to assemble, and more particularly, to 3D eyeglasses with a detachable front eyeglasses frame that are easy to assembly wherein attaching and detaching protrusions are formed at the center of the front surface of a coupling rim of eyeglasses arms so as to attach and detach the detachable front eyeglasses frame to and from the front surface of the coupling rim; the lenses of the 3D eyeglasses are freely interchangeable in accordance with the power of a wearer's eyeglasses; and if a person who is wearing his eyeglasses desires to wear the 3D eyeglasses thereon, the 3D eyeglasses are worn just on his eyeglasses, thereby providing a convenient wearing structure to the wearer.

2. Background of the Related Art

With the development of image technology, recently, 3D movie pictures are put on the screen. Conventional 3D eyeglasses have the lenses fixed inside a frame, and when the 3D eyeglasses are worn, it is very inconvenient to use them if the power of the 3D eyeglasses is different from that of a wearer's eyeglasses. Further, according to the conventional 3D eyeglasses, it is impossible to interchange the lenses with other ones and the eyeglasses frame is formed as a unitary body with the 3D eyeglasses, such that the wearer feels uncomfortable when he sees a 3D movie picture. Additionally, according to the conventional 3D eyeglasses, since the lenses are fixed to the eyeglasses frame, the lenses are not interchangeable in accordance with the power of the wearer's eyeglasses or ages if the power of the 3D eyeglasses is different from that of his eyeglasses.

SUMMARY OF THE INVENTION

Accordingly, the present invention has been made in view of the above-mentioned problems occurring in the prior art, and it is an object of the present invention to provide 3D eyeglasses with a detachable front eyeglasses frame that have attaching and detaching protrusions formed at the center of the front surface of a coupling rim of eyeglasses arms so as to attach and detach the detachable front eyeglasses frame to and from the front surface of the coupling rim and that provide 3D eyeglasses lenses freely interchangeable in accordance with the power of a wearer's eyeglasses.

To accomplish the above object, according to the present invention, there are provided 3D eyeglasses with a detachable front eyeglasses frame, the 3D eyeglasses including: eyeglasses arms having a coupling rim disposed in the middle portion thereof and attaching and detaching protrusions formed at the center portion of the coupling rim; the detachable front eyeglasses frame having lens insertion holes formed on both sides thereof, fixing protrusions formed at each of the upper and lower sides of the lens insertion holes on the rear surface thereof, and attaching and detaching grooves formed at the center portion of the rear surface thereof; and 3D eyeglasses lenses adapted to be inserted into the lens insertion holes of the detachable front eyeglasses frame.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
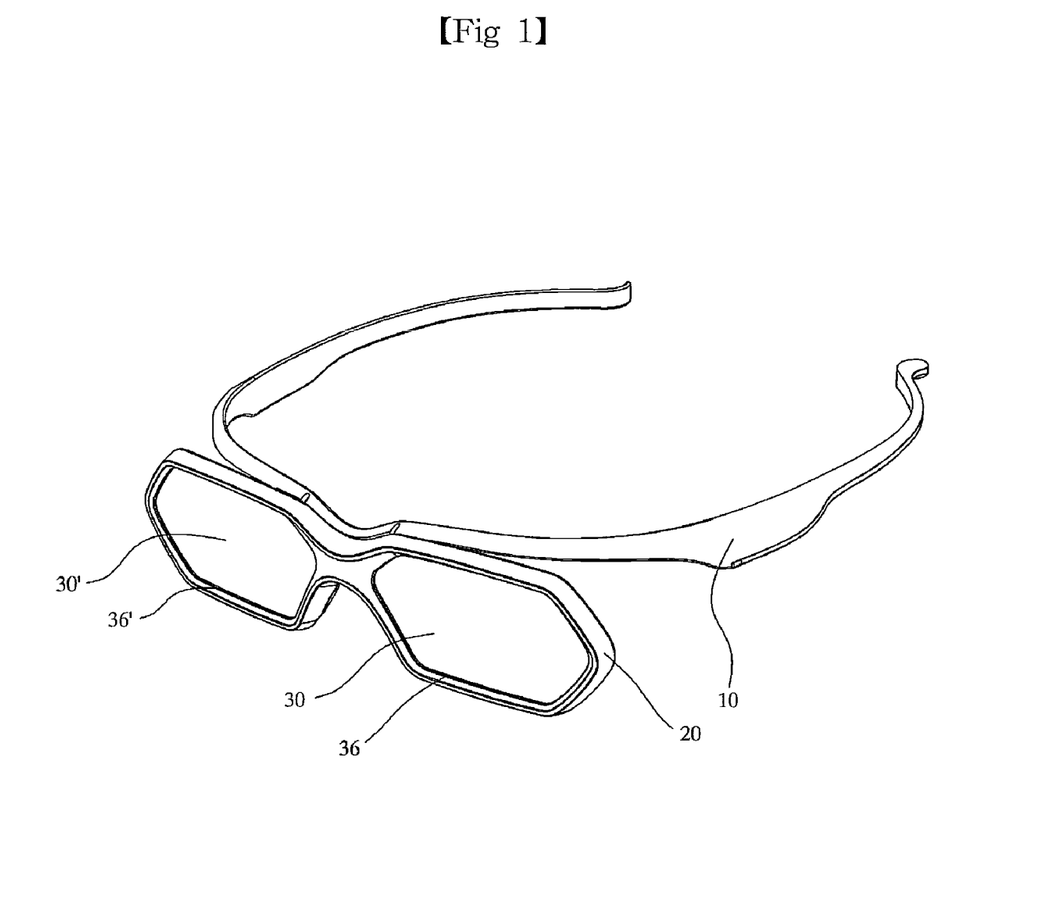
FIG. 1 is a perspective view showing a state wherein 3D eyeglasses according to the present invention are in an assembled state.
Figure 2:
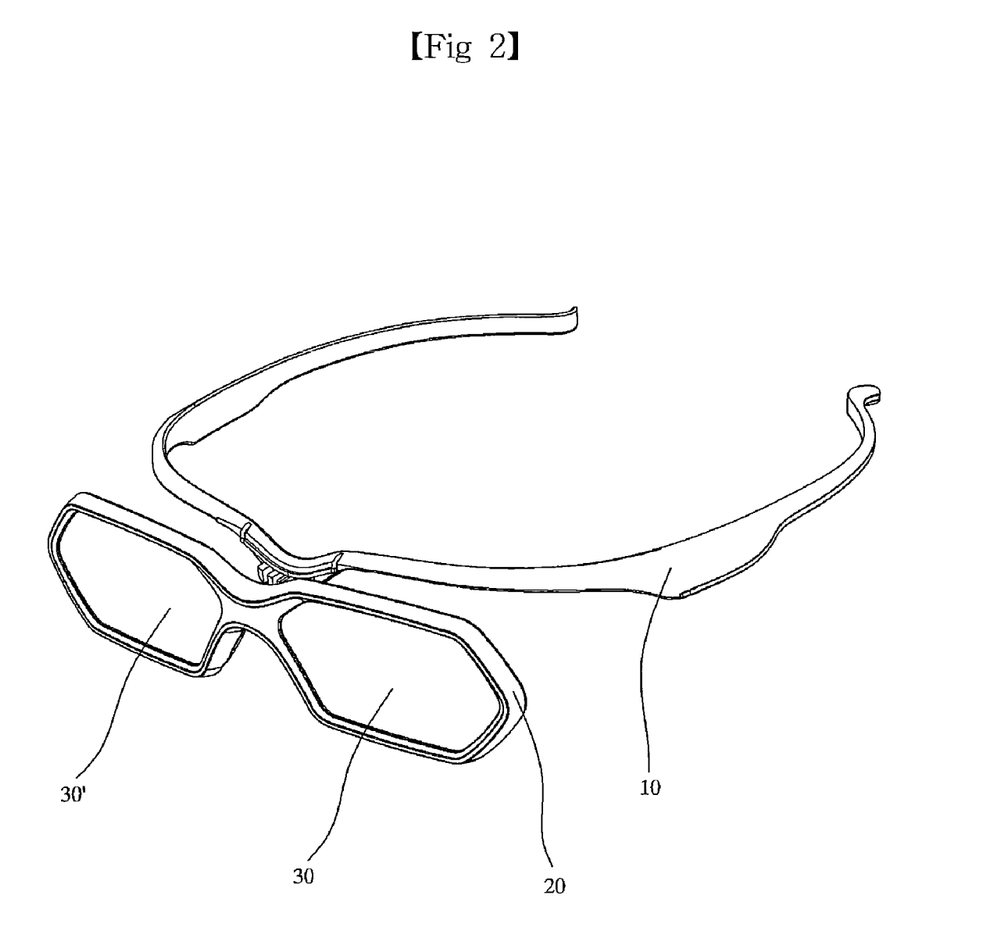
FIG. 2 is an exploded perspective view showing the 3D eyeglasses according to the present invention.
Figure 3:
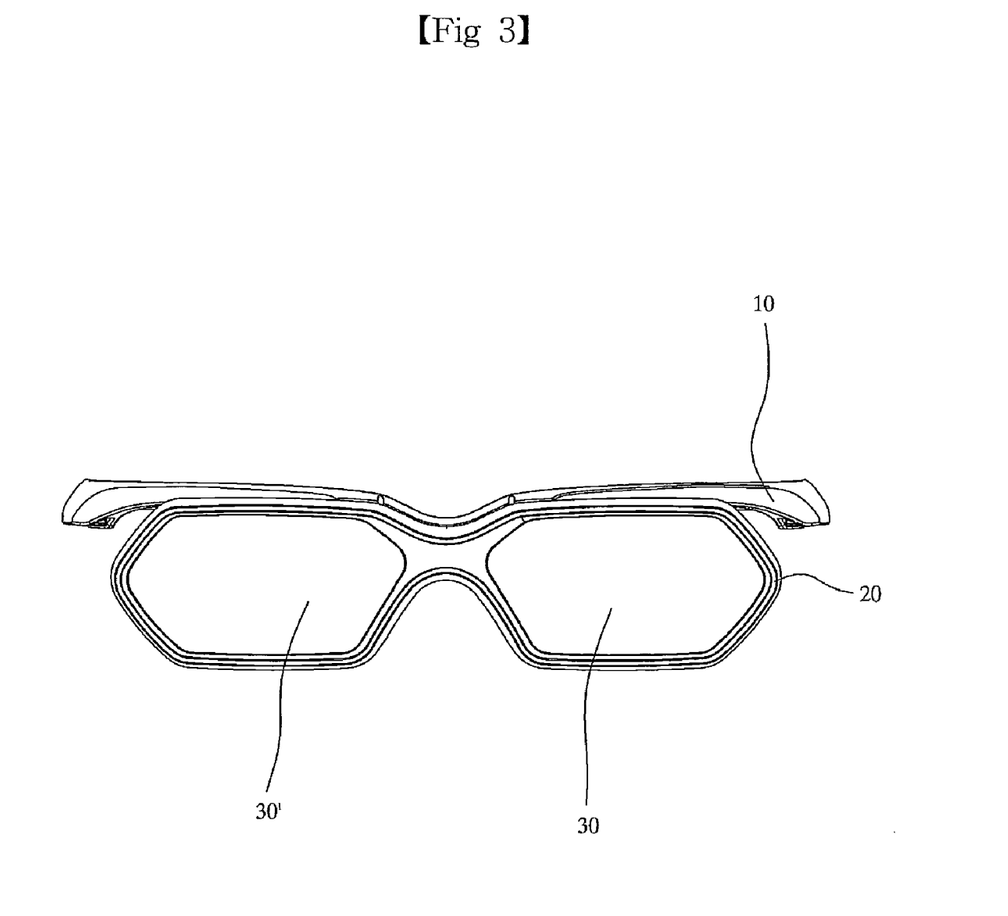
FIG. 3 is a front view showing the 3D eyeglasses according to the present invention.
Figure 4:
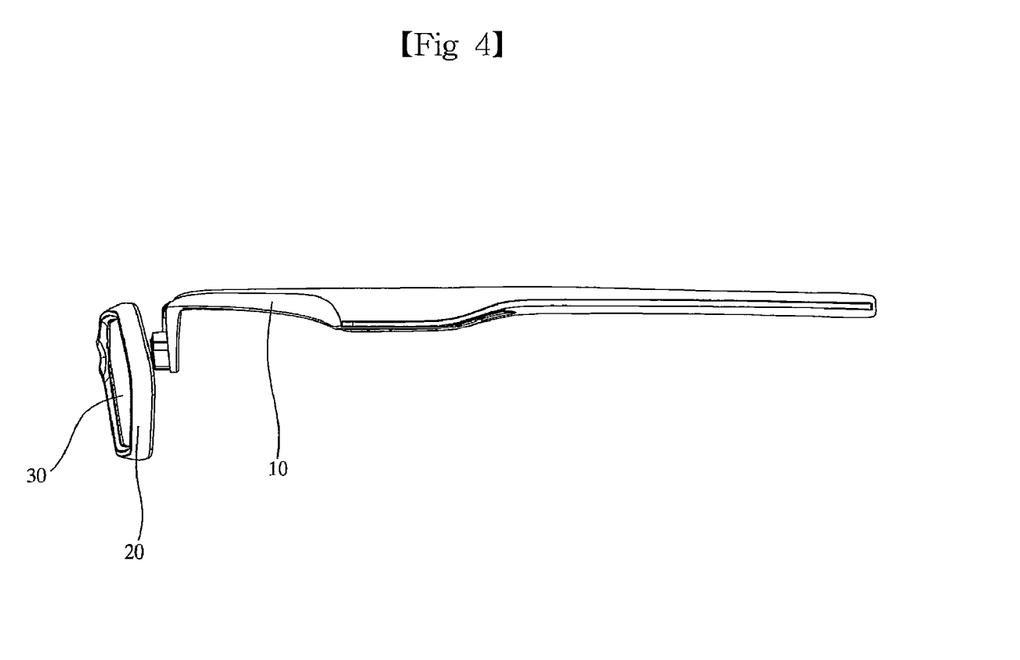
FIG. 4 is a side view showing the 3D eyeglasses according to the present invention.
Figure 5:
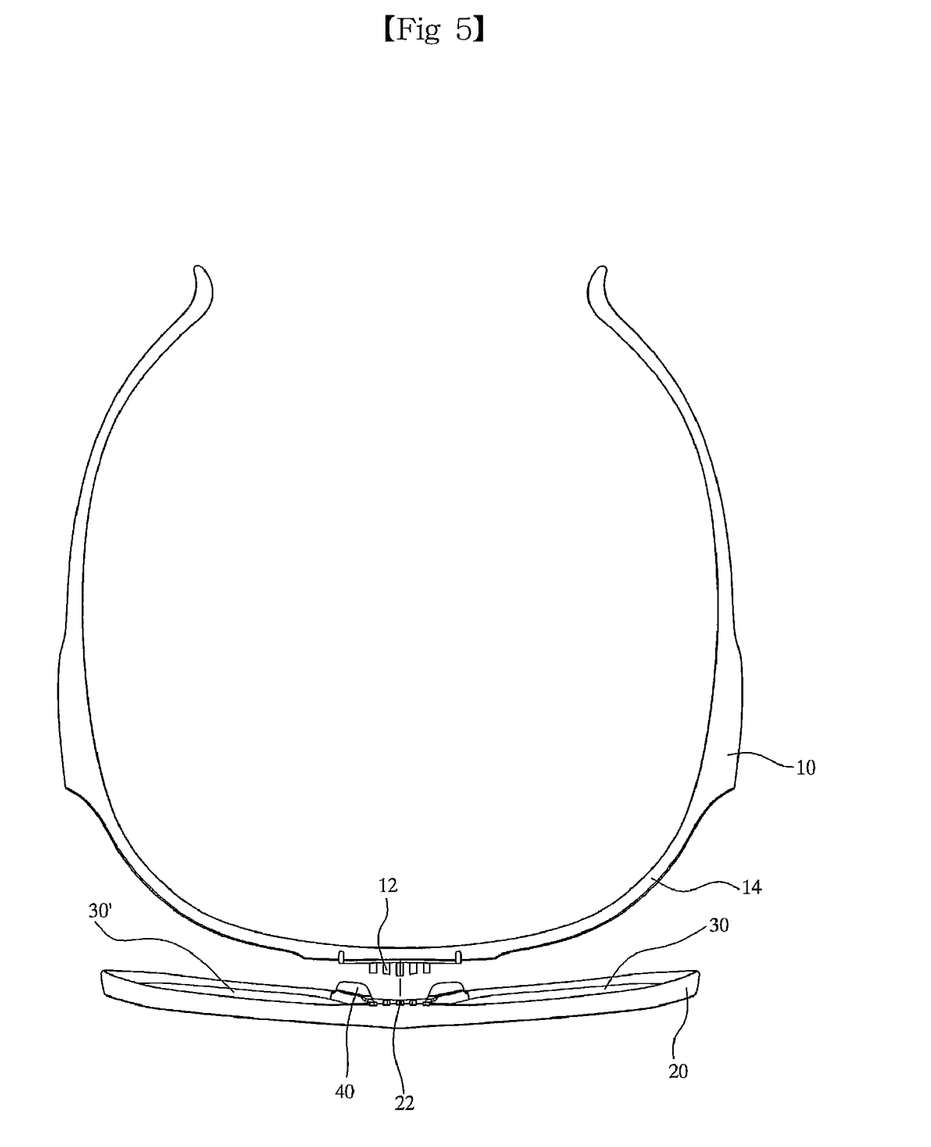
FIG. 5 is a plan view showing the 3D eyeglasses according to the present invention.
Figure 6:
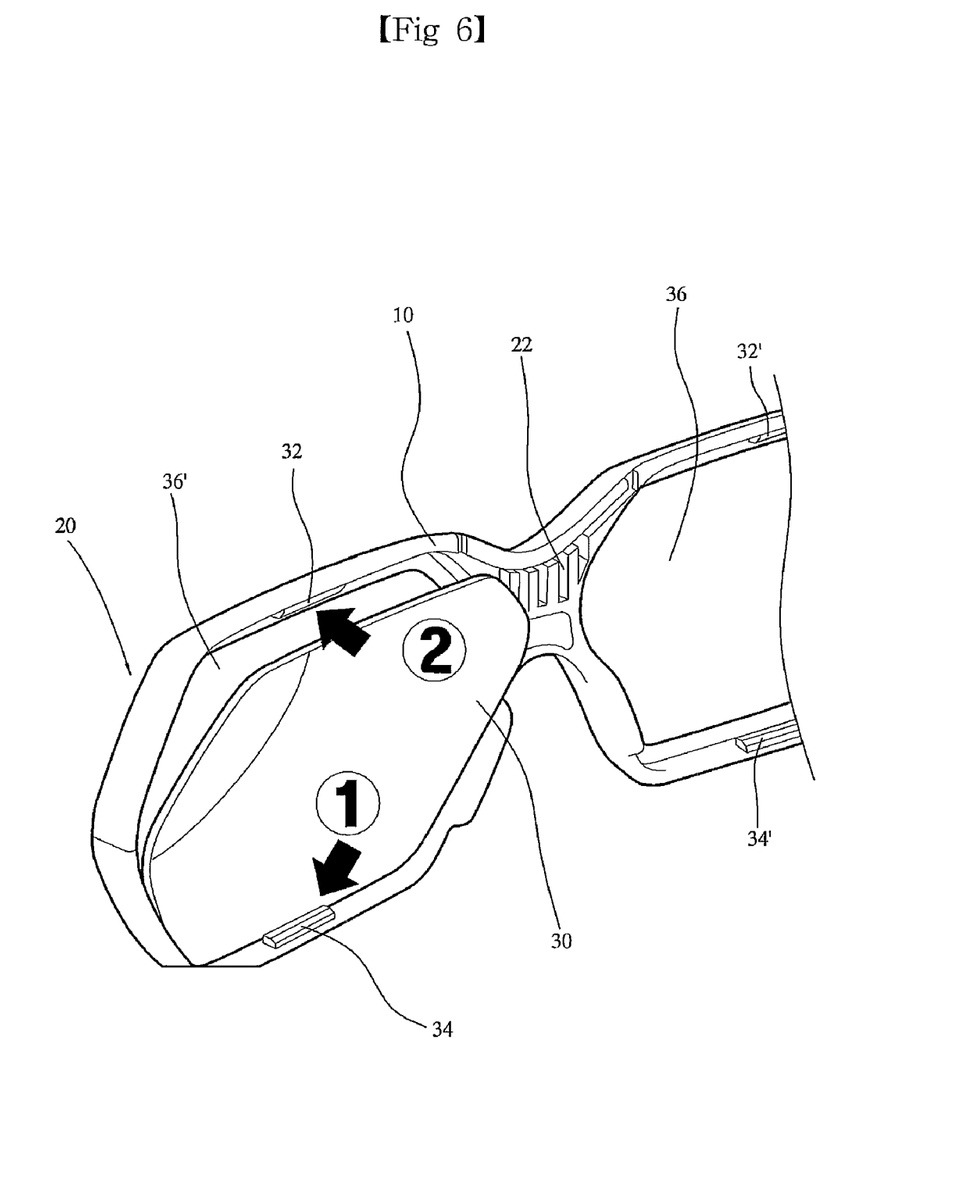
FIG. 6 is an exploded perspective view showing a state wherein the 3D eyeglasses according to the present invention are coupled to one side lens.
Figure 7:
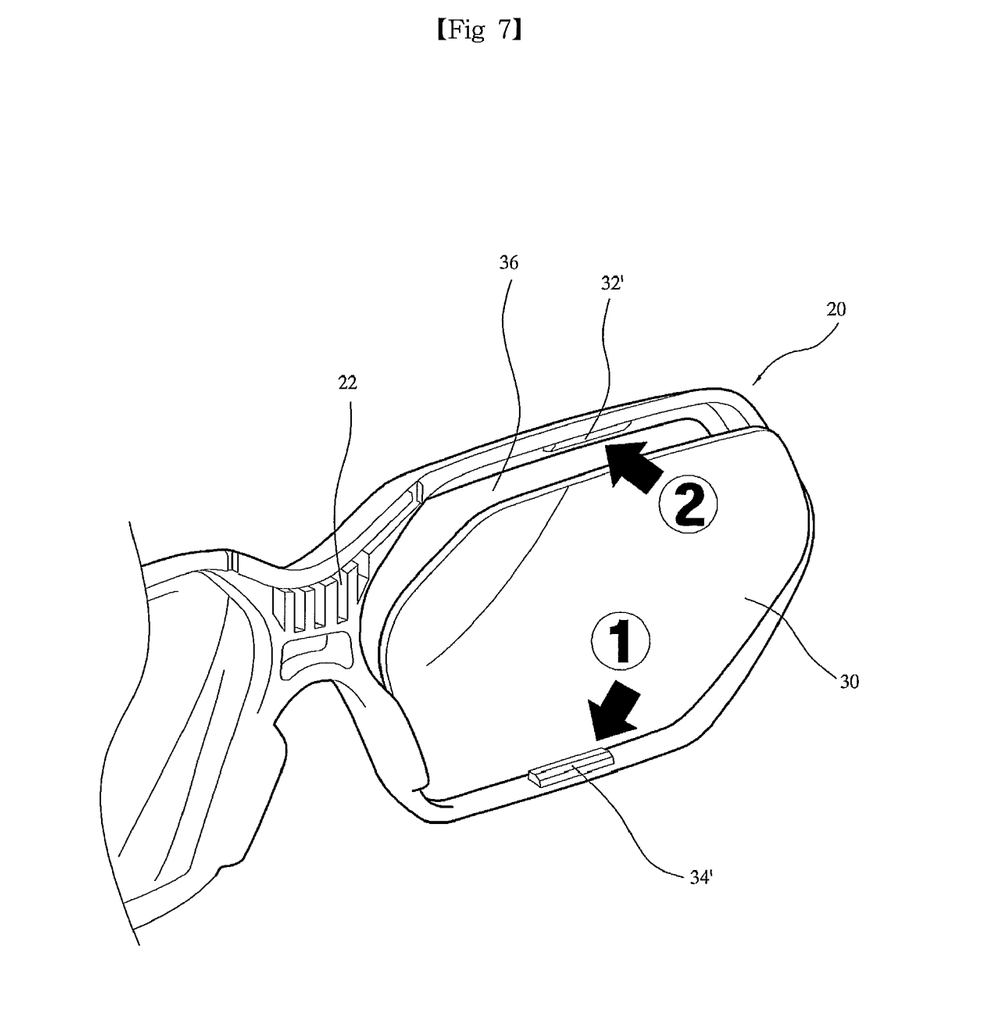
FIG. 7 is an exploded perspective view showing a state wherein the 3D eyeglasses according to the present invention are coupled to the other lens.
Figure 8:
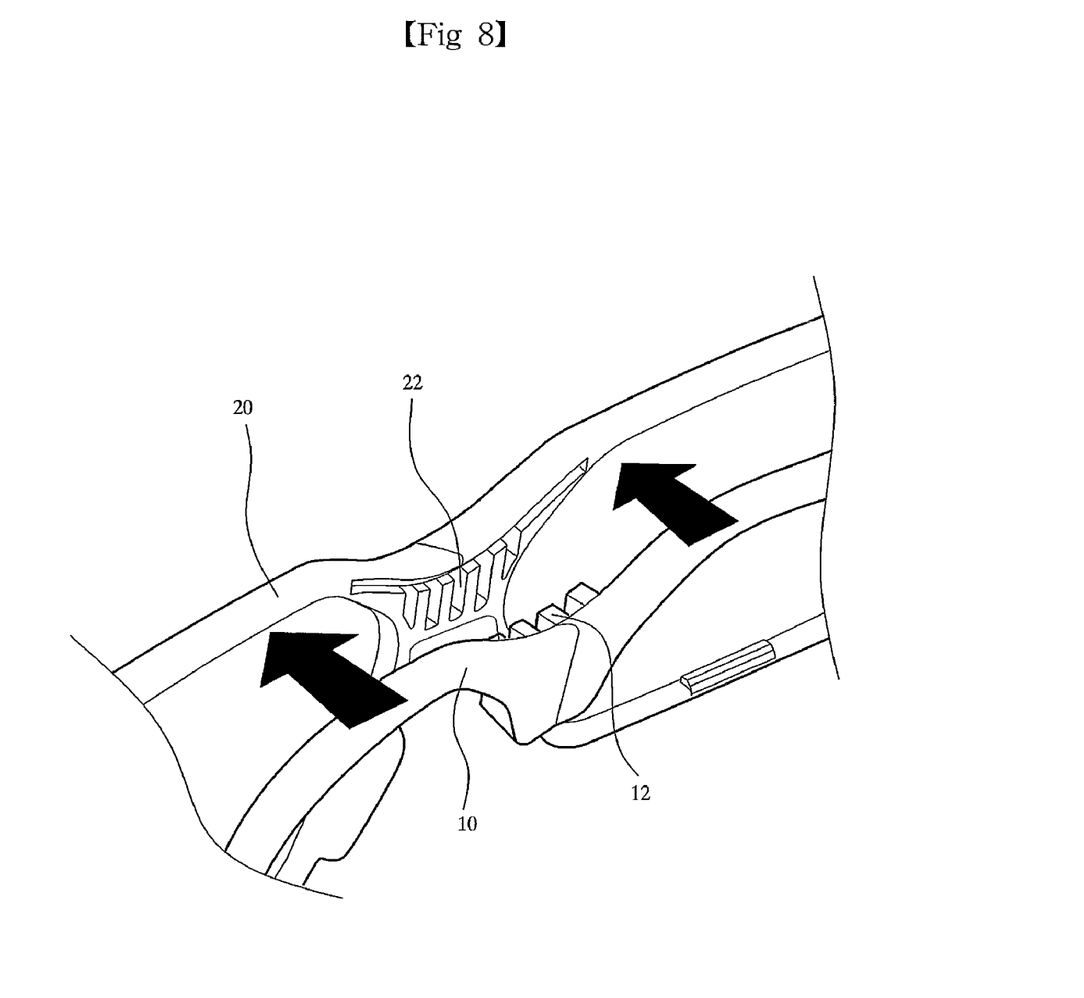
FIG. 8 is an exploded perspective view showing a state wherein a detachable front eyeglasses frame is attached to the 3D eyeglasses according to the present invention.

Hereinafter, an explanation on 3D eyeglasses with a detachable front eyeglasses frame according to the present invention will be in detail given with reference to the attached drawings.

According to the present invention, there are provided 3D eyeglasses with a detachable front eyeglasses frame that are easy to assemble, the 3D eyeglasses including: eyeglasses arms 10 having a coupling rim 14 disposed in the middle portion thereof and arm portions disposed on both sides thereof, the coupling rim 14 having attaching and detaching protrusions 12 formed at the center thereof; the detachable front eyeglasses frame 20 having lens insertion holes 36 and 36' formed on both sides thereof so as to insert 3D eyeglasses lenses 30 and 30' thereinto, fixing protrusions 32, 34, 32' and 34' formed at each of the upper and lower sides of the lens insertion holes 36 and 36' on the rear surface thereof so as to fix the 3D eyeglasses lenses 30 and 30' inserted into the lens insertion holes 36 and 36' thereto, and attaching and detaching grooves 22 formed at the center portion of the rear surface thereof so as to insertedly fix the attaching and detaching protrusions 12 of the eyeglasses arms 10 thereto; and the 3D eyeglasses lenses 30 and 30' adapted to be inserted into the lens insertion holes 36 and 36' of the detachable front eyeglasses frame 20.

The 3D eyeglasses according to the present invention are made of a synthetic resin and are configured to interchange the lenses in accordance with the power of a wearer's eyeglasses.

Accordingly, the detachable front eyeglasses frame 20 is attached to and detached from the front surface of the coupling rim 14, and the 3D eyeglasses lenses 30 and 30' are freely interchangeable in accordance with the power of a wearer's eyeglasses.

According to the present invention, like general eyeglasses, the eyeglasses arms 10 of the 3D eyeglasses are configured to have the coupling rim 14 formed in the middle portion thereof and the arm portions disposed on the both sides thereof, and further, the eyeglasses arms 10 have the attaching and detaching protrusions 12 formed at the center portion of the front surface of the coupling rim 14 so as to attach and detach the detachable front eyeglasses frame 20 to and from the front surface of the coupling rim 14.

According to the present invention, the detachable front eyeglasses frame 20 is attached to and detached from the front surface of the coupling rim 14, and has the lens insertion holes 36 and 36' formed on both sides thereof so as to insert the 3D eyeglasses lenses 30 and 30' thereinto, the fixing protrusions 32, 34, 32' and 34' formed at each of the upper and lower sides of the lens insertion holes 36 and 36' on the rear surface thereof so as to fix the 3D eyeglasses lenses 30 and 30' inserted into the lens insertion holes 36 and 36' thereto, the attaching and detaching grooves 22 formed at the center portion of the rear surface thereof so as to insertedly fix the attaching and detaching protrusions 12 of the eyeglasses arms 10 thereto, and a nose pad 40 disposed at both sides of the attaching and detaching grooves 22, respectively.

According to the present invention, the 3D eyeglasses lenses 30 and 30' are interchangeably fixed to the lens insertion holes 36 and 36' of the detachable front eyeglasses frame 20 in accordance with the power of the wearer's eyeglasses, thereby allowing the 3D eyeglasses to be freely selected in accordance with the power of the wearer's eyeglasses.

According to the present invention, further, the 3D eyeglasses are made of a synthetic resin and are directly assembled by the wearer's manipulation. Additionally, the lenses of the 3D eyeglasses are freely interchangeable in accordance with the power of the wearer's eyeglasses, and each of the parts of the 3D eyeglasses is supplied as a package set.

As set forth in the foregoing, there are provided the 3D eyeglasses with the detachable front eyeglasses frame that are easy to assemble, wherein the attaching and detaching protrusions are formed at the center portion of the front surface of the coupling rim of the eyeglasses arms, thereby allowing the detachable front eyeglasses frame to be attached to and detached from the front surface of the coupling rim of the eyeglasses arms, and the 3D eyeglasses lenses are interchangeable in accordance with the power of the wearer's eyeglasses, thereby allowing the 3D eyeglasses to be freely selected in accordance with the power of the wearer's eyeglasses.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. 3D eyeglasses with a detachable front eyeglasses frame, the 3D eyeglasses comprising:
    eyeglasses arms having a coupling rim disposed in the middle portion thereof and arm portions disposed on both sides thereof, the coupling rim having attaching and detaching protrusions formed at the center thereof;
    the detachable front eyeglasses frame attached to and detached from the coupling rim of the eyeglasses arms and having lens insertion holes formed on both sides thereof so as to insert 3D eyeglasses lenses thereinto, fixing protrusions formed at each of the upper and lower sides of the lens insertion holes on the rear surface thereof so as to fix the 3D eyeglasses lenses inserted into the lens insertion holes thereto, attaching and detaching grooves formed at the center portion of the rear surface thereof so as to insertedly fix the attaching and detaching protrusions of the eyeglasses arms thereto, and nose pads disposed at both sides of the attaching and detaching grooves; and
    the 3D eyeglasses lenses adapted to be inserted into the lens insertion holes of the detachable front eyeglasses frame.

2. The 3D eyeglasses according to claim 1, wherein the 3D eyeglasses are made of a synthetic resin, and the 3D eyeglasses lenses are interchangeable in accordance with the power of a wearer's eyeglasses.

* * * * *